United States Patent
Hirata

(10) Patent No.: US 8,418,447 B2
(45) Date of Patent: Apr. 16, 2013

(54) EXHAUST GAS CLEANING CATALYST, EXHAUST GAS CLEANING DEVICE, AND SYSTEM COMPRISING INTERNAL COMBUSTION ENGINE

(75) Inventor: Hirohito Hirata, Suntou-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 134 days.

(21) Appl. No.: 13/137,103

(22) Filed: Jul. 20, 2011

(65) Prior Publication Data

US 2011/0277452 A1 Nov. 17, 2011

Related U.S. Application Data

(63) Continuation of application No. 11/659,535, filed as application No. PCT/JP2005/015835 on Aug. 24, 2005, now Pat. No. 8,011,181.

(30) Foreign Application Priority Data

Sep. 9, 2004 (JP) ................................ 2004-262066

(51) Int. Cl.
*F01N 3/10* (2006.01)
*B01D 50/00* (2006.01)
*B01D 53/34* (2006.01)
*B01J 27/02* (2006.01)
*B01J 27/053* (2006.01)
*B01J 27/055* (2006.01)

(52) U.S. Cl.
USPC ............ 60/301; 60/285; 422/171; 422/180; 502/216; 502/217; 502/218

(58) Field of Classification Search ............ 60/285, 60/297, 299, 301; 422/168–171, 177, 180; 502/216–218, 304, 344, 439
See application file for complete search history.

(56) References Cited

U.S. PATENT DOCUMENTS

| | | | |
|---|---|---|---|
| 5,795,554 | A | 8/1998 | Fang et al. |
| 6,141,960 | A | 11/2000 | Takami et al. |
| 6,287,527 | B1 | 9/2001 | Kawanami et al. |
| 6,296,824 | B1 | 10/2001 | Leppert |
| 6,355,220 | B1 | 3/2002 | Blanchard et al. |
| 6,806,225 | B1 | 10/2004 | Ikeda et al. |
| 6,808,687 | B1 | 10/2004 | Uenishi et al. |

(Continued)

FOREIGN PATENT DOCUMENTS

| DE | 100 24 994 A1 | 1/2001 |
|---|---|---|
| EP | 1 046 423 A2 | 10/2000 |

(Continued)

OTHER PUBLICATIONS

United States Patent Application issued on Jun. 23, 2009 in U.S. Appl. No. 12/448,501 in the name of Machida et al.

(Continued)

*Primary Examiner* — Kenneth Bomberg
*Assistant Examiner* — Audrey K Bradley
(74) *Attorney, Agent, or Firm* — Oliff & Berridge, PLC

(57) ABSTRACT

The invention makes use of an exhaust gas catalyst, comprising an active component comprising at least one type of metal from noble metals and transition metals; NOx-absorbing material for absorbing and releasing nitrogen oxides according to the surrounding nitrogen oxide concentration; and compounds represented by $A_2O_2SO_4$ and/or $A_2O_2S$ (A is a rare earth element).

7 Claims, 6 Drawing Sheets

U.S. PATENT DOCUMENTS

| | | |
|---|---|---|
| 2004/0065076 A1 | 4/2004 | Katoh et al. |
| 2004/0198595 A1 | 10/2004 | Chen |
| 2008/0000222 A1 | 1/2008 | Hirata |

FOREIGN PATENT DOCUMENTS

| | | |
|---|---|---|
| EP | 1095702 A1 | 5/2001 |
| JP | A-05-208816 | 8/1993 |
| JP | A-07-213902 | 8/1995 |
| JP | A-10-174866 | 6/1998 |
| JP | A-11-267504 | 10/1999 |
| JP | A-11-292538 | 10/1999 |
| JP | A-11-322339 | 11/1999 |
| JP | A-2002-011350 | 1/2002 |
| JP | A-2004-028041 | 1/2004 |
| JP | A-2004-100626 | 4/2004 |
| JP | A-2005-87892 | 4/2005 |
| JP | A-2006-75716 | 3/2006 |
| WO | WO 95/35152 A1 | 12/1995 |
| WO | WO 2006/027976 A1 | 3/2006 |

OTHER PUBLICATIONS

United States Patent Application issued on Nov. 10, 2009 in U.S. Appl. No. 12/451,387 in the name of Machida et al.

International Search Report issued on Oct. 22, 2008 in International Application No. PCT/JP2008/059502.

International Search Report issued on Dec. 23, 2005 in International Application No. PCT/JP2005/015835.

International Search Report issued on Aug. 22, 2008 in International Application No. PCT/JP2008/059593.

EXHAUST GAS CLEANING CATALYST, EXHAUST GAS CLEANING DEVICE, AND SYSTEM COMPRISING INTERNAL COMBUSTION ENGINE

This is a Continuation of application Ser. No. 11/659,535 filed Feb. 6, 2007, which in turn is a National Stage of Application No. PCT/JP2005/015835, filed Aug. 24, 2005, which claims priority to Japanese Patent Application No. 2004-262066, filed Sep. 9, 2004. The disclosure of the prior applications are hereby incorporated by reference herein in their entireties.

TECHNICAL FIELD

The invention relates to an exhaust gas cleaning catalyst, an exhaust gas cleaning device, and a system comprising an internal combustion engine.

BACKGROUND ART

Conventional techniques for cleaning the exhaust gas discharged from internal combustion engines and the like include the use of three-way catalysts as exhaust gas cleaning catalysts for simultaneously cleaning NOx, CO, and HC. When three-way catalysts are used to clean exhaust gas, the combustion reaction of the internal combustion engine must be controlled to the stoichiometric (theoretical) air/fuel ratio in order to simultaneously clean NOx, CO, and HC. Structures involving the use of oxygen-absorbing materials are also known in techniques employing such three-way catalysts. Such oxygen-absorbing materials absorb oxygen in environments having an excess of oxygen and release oxygen in environments where the oxygen concentration is depleted. The use of an oxygen-absorbing material in addition to a three-way catalyst in order to control the combustion to the stoichiometric level allows the catalyst environment to be kept in a substantially stoichiometric state, even when somewhat tardy control or the like results in slight deviations from the stoichiometric level, so as to ensure better catalyst function.

In another known technique, a mode for conversion to lean (excess air) combustion is provided in addition to the mode for stoichiometric operation of the internal combustion engine in order to improve the fuel consumption of the internal combustion engine. In this case, when lean combustion results in exhaust gas with excess air, three-way catalysts are generally unable to clean the NOx sufficiently. A structure that has thus been proposed (such as JP A 7-213902) is to add an NOx-absorbing material to the three-way catalyst so as to allow NOx produced during lean operations to be absorbed by the NOX-absorbing material. In cases where an NOx-absorbing material is thus provided in the exhaust gas cleaning device, when it is determined that the amount of NOx absorbed by the NOx-absorbing material is over a certain amount, the lean operation is temporarily suspended on behalf of a short period of fuel-rich operation (referred to as rich spike). As a result, the NOx absorbed to the NOx-absorbing material is released, and HC or CO produced by the combustion reaction during the rich spike function as reducing agents to clean the NOx. An oxygen-absorbing material may also be provide when using an NOx-absorbing material with a three-way catalyst to stabilize the exhaust gas cleaning performance in stoichiometric operating mode.

Ceria ($CeO_2$) and the like have conventionally been used as oxygen-absorbing material in three-way catalysts. However, because conventionally known oxygen-absorbing materials such as $CeO_2$ work at temperatures of up to about 400° C. when absorbing and releasing oxygen, oxygen cannot be sufficiently absorbed and released when the exhaust gas temperature increases such as during high loads (during high engine rpm, for example). In such cases, if there are delays or the like in control during stoichiometric combustion in the internal combustion engine, it is possible that the provision of an oxygen-absorbing material will not satisfactorily preserve the three-way catalyst performance.

In cases where an exhaust gas cleaning device comprising an NOx-absorbing element added to a three-way catalyst is used for lean operation, the temperature range within which NOx is absorbed and released by a conventionally know NOx-absorbing material such as an alkali metal is about 300 to 600° C., resulting in temperatures that overlap the temperatures at which the oxygen-absorbing material releases oxygen. As a result, rich spikes which are intended to clean NOx during lean operation may result in the release of NOx from the NOx-absorbing material and the release of oxygen from the oxygen-absorbing material. The reducing agents such as CO and HC which are produced during the rich spike react with the NOx released from the NOx-absorbing material as well as the oxygen released from the oxygen-absorbing material. Thus, to ensure that the NOx absorbed and released by the NOx-absorbing material is treated enough, it has been necessary to consume much of the fuel during rich spikes to obtain more HC and CO. As such, providing oxygen-absorbing materials may result in lower fuel consumption during rich spikes which occur during lean operation because of oxygen released from the oxygen-absorbing material.

DISCLOSURE OF THE INVENTION

An object of the present invention, which is intended to address the conventional drawbacks noted above, is to clean exhaust gas more efficiently, regardless of the exhaust gas temperature, when using oxygen-absorbing materials to clean exhaust gas.

To achieve the above object, the first aspect of the invention provides an exhaust gas cleaning catalyst for cleaning exhaust gas by redox. The exhaust gas cleaning catalyst of the first aspect of the invention comprises at least one type of metal from noble metals and transition metals, NOx-absorbing material for absorbing and releasing nitrogen oxides according to the surrounding nitrogen oxide concentration, and compounds represented by $A_2O_2SO_4$ and/or $A_2O_2S$ (A is a rare earth element).

According to the exhaust gas cleaning catalyst of the first aspect of the invention constructed in the above manner, oxygen is absorbed in an oxygen-rich environment by compounds represented by $A_2O_2SO_4$ and/or $A_2O_2S$ (A is a rare earth element) at a temperature range where the NOx-absorbing material will not absorb and release enough NOx, making it possible for oxygen to be released in oxygen-depleted atmospheres. This type of exhaust gas cleaning catalyst may therefore be used to allow the exhaust gas produced by combustion around the stoichiometric air/fuel ratio to be cleaned in a stable manner in a temperature range where the NOx-absorbing material will not absorb and release enough NOx. The aforementioned compounds also will release virtually no absorbed oxygen in a temperature range where the NOx-absorbing material may absorb and release enough NOx. Thus, when the NOx absorbed by the NOx-absorbing material is released in order to reduce and clean the released NOx, no oxygen will be released from the above compounds and lower the NOx cleaning efficiency.

In the exhaust gas cleaning catalyst of the first aspect of the invention, the NOx-absorbing material may include at least one element among alkali metals, alkaline earth metals, and rare earth elements.

In this case, exhaust gases produced by combustion near the stoichiometric air/fuel ratio may be cleaned in a stable manner by redox at a temperature of about 600° C. or more. At an exhaust gas temperature of about 300 to 600° C., CO and HC may be cleaned by redox, and NOx may be cleaned by absorption to the NOx-absorbing material.

The second aspect of the invention provides an exhaust gas cleaning device that cleans exhaust gas by redox. The exhaust gas cleaning device of the second aspect of the invention comprises the exhaust gas cleaning catalyst of the first aspect of the invention.

This sort of exhaust gas cleaning device may provide the effects described above using the exhaust gas cleaning catalyst of the first aspect of the invention when cleaning exhaust gas.

The third aspect of the invention provides an exhaust gas cleaning device that cleans exhaust gas by redox. The exhaust gas cleaning device of the third aspect of the invention comprises a catalyst component comprising at least one type of metal from noble metals and transition metals, and NOx-absorbing material for absorbing and releasing nitrogen oxides according to the surrounding nitrogen oxide concentration, and an oxygen-absorbing component comprising a compound represented by $A_2O_2SO_4$ and/or $A_2O_2S$ (A is a rare earth element), wherein the oxygen-absorbing component and catalyst component are connected in a straight line so that the exhaust gas that is to be cleaned is fed into the catalyst component after passing through the oxygen gas-absorbing component.

In this sort of exhaust gas cleaning device of the third aspect of the inventions, the NOx-absorbing material may comprise at least one element among alkali metals, alkaline earth metals, and rare earth elements.

The same effects as the exhaust gas cleaning device of the first aspect of the inventions may be obtained even though, as noted above, the oxygen-absorbing component comprising a compound represented by $A_2O_2SO_4$ and/or $A_2O_2S$ (A is a rare earth element) is separate from the catalyst component comprising at least one type of metal from noble metals and transition metals, and NOx-absorbing material.

The fourth aspect of the invention provides an internal combustion system. The internal combustion system of the fourth aspect of the present invention comprises an exhaust gas cleaning device according to the second or third aspect of the invention, to which exhaust gas discharged from the internal combustion engine is introduced, the operating modes of the internal combustion engine comprise a first mode in which the air/fuel ratio of the combustion in the internal combustion engine is controlled to the stoichiometric ratio, and a second mode in which the air/fuel ratio of the combustion in the internal combustion engine results in an excess of oxygen.

In internal combustion engines in which the operating modes comprise a first mode with a stoichiometric air/fuel ratio and a second mode with an oxygen-rich air/fuel ratio, the exhaust gas discharged in the first mode is generally hotter than the exhaust gas from the second oxygen-rich mode. Under the temperature conditions of the exhaust gas in the first mode, oxygen is absorbed and released by compounds represented by $A_2O_2SO_4$ and/or $A_2O_2S$ (A is a rare earth element) comprising an exhaust gas cleaning catalyst. As such, when the exhaust gas cleaning catalyst provided in the exhaust gas cleaning device of the invention is used in the form a three-way catalyst, the oxygen concentration in the exhaust gas approaches the theoretical state during combustion at the stoichiometric ratio, allowing the exhaust gas to be cleaned in a highly efficient manner. Fuel consumption is also improved b oxygen-rich in the second mode in which the exhaust gas temperature is lower. At that time, under the temperature conditions of the exhaust gas in the second mode, the untreated NOx is absorbed by the NOx-absorbing material by redox, making it possible to keep cleaning the exhaust gas at high levels. Furthermore, because of the lower activity in the release of the oxygen by the compounds represented $A_2O_2SO_4$ and/or $A_2O_2S$ (A is a rare earth element) under such temperature conditions, it is possible to prevent decreases in NOx cleaning efficiency caused by oxygen that has been released by those compounds when NOx is released from the NOx-absorbing material to allow the NOx to be reduced.

The fifth aspect of the invention provides an exhaust gas cleaning catalyst for cleaning exhaust gas by redox. The exhaust gas cleaning catalyst of the fifth aspect of the invention comprises at least one type of metal from noble metals and transition metals, a first oxygen-absorbing material for absorbing and releasing oxygen under conditions involving relatively high temperatures, and a second oxygen-absorbing material for absorbing and releasing oxygen under conditions involving temperatures lower than the temperatures at which the first oxygen-absorbing material absorbs and releases oxygen.

In the exhaust gas cleaning catalyst of the fifth aspect of the invention constructed in the above manner, oxygen may be absorbed and released at a broader temperature range, thus increasing the performance of the three-way catalyst at a broader temperature range, while allowing the exhaust gas to be cleaned in a more stable manner regardless of the exhaust gas temperature.

In the exhaust gas cleaning catalyst of the fifth aspect of the invention, the first oxygen-absorbing material may be a compound represented by $A_2O_2SO_4$ and/or $A_2O_2S$ (A is a rare earth element). This structure allows the first oxygen-absorbing material to absorb excess oxygen and release oxygen when the oxygen is depleted at an exhaust gas temperature of about 500° C. or more.

In the exhaust gas cleaning catalyst of the fifth aspect of the invention, the second oxygen-absorbing material may contain at least cesium (Ce). This structure allows the second oxygen-absorbing material to absorb excess oxygen and release oxygen when the oxygen is depleted at an exhaust gas temperature up to about 500° C.

The sixth aspect of the invention provides an exhaust gas cleaning device for cleaning exhaust gas by redox. The exhaust gas cleaning device of the sixth aspect of the invention comprises an exhaust gas cleaning catalyst according to the fifth aspect of the invention.

This sort of exhaust gas cleaning device may provide the effects described above using the exhaust gas cleaning catalyst of the fifth aspect of the invention when cleaning exhaust gas.

The seventh aspect of the invention provides an exhaust gas cleaning device for cleaning exhaust gas by redox. The exhaust gas cleaning device of the seventh aspect of the invention comprises a catalyst component comprising at least one type of metal from noble metals and transition metals, a first oxygen-absorbing component comprising a first oxygen-absorbing material for absorbing and releasing oxygen under conditions involving relatively high temperatures, and a second oxygen-absorbing component comprising a second oxygen-absorbing material for absorbing and releasing oxygen under conditions involving temperatures lower than the temperatures at which the first oxygen-absorbing material absorbs and releases oxygen, wherein the first and second oxygen-absorbing components are disposed upstream of the catalyst component relative to the flow of the exhaust gas that is to be cleaned.

In the exhaust gas cleaning device of the seventh aspect of the invention, the first oxygen-absorbing material may be a compound represented by $A_2O_2SO_4$ and/or $A_2O_2S$ (A is a rare earth element). The second oxygen-absorbing material in the exhaust gas cleaning device in the fourth of the inventions may also contain at least cesium (Ce).

The same effects as the exhaust gas cleaning device of the sixth aspect of the invention may thus be obtained by the exhaust gas cleaning device in the fourth of the inventions in which the first oxygen-absorbing material and second oxygen-absorbing material are separate from the at least one metal from noble metals and transition metals.

The present invention may be implemented in a variety of configurations other than those described above, and may be worked, for example, in the form of methods for producing exhaust gas cleaning catalysts, and mobile objects equipped with the exhaust gas cleaning system of the invention.

BEST MODES OF CARRYING OUT THE INVENTION

Embodiments of the invention will be illustrated with referring the drawings.

A. First Exhaust Gas Cleaning Catalyst

Figure 1:
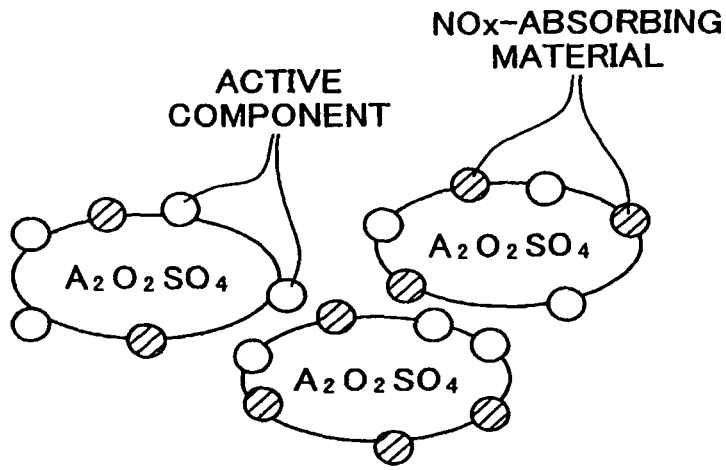
FIG. 1 schematically illustrates the structure of the first exhaust gas cleaning catalyst.

The first exhaust gas cleaning catalyst serving as an embodiment of the invention comprises an active component exhibiting catalytic activity in redox reactions, an oxygen-absorbing material represented by $A_2O_2SO_4$ and/or $A_2O_2S$ (A is a rare earth element), and NOx-absorbing material. FIG. 1 schematically illustrates the structure of the first exhaust gas cleaning catalyst. As illustrated in FIG. 1, the NOx-absorbing material and active component are supported on an oxygen-absorbing material in the form of fine particles in the first exhaust gas cleaning catalyst. The oxygen-absorbing material actually comprises numerous fine pores, and the active component and NOx-absorbing material are dispersed and supported on the surface.

In the first exhaust gas cleaning catalyst, the oxygen-absorbing material described above absorbs and releases oxygen under certain temperature conditions. That is, the above oxygen-absorbing material absorbs oxygen under certain temperature conditions in when the oxygen concentration is high, and releases the absorbed oxygen under certain temperature conditions when the oxygen concentration is low. The oxygen-absorbing material is converted to $A_2O_2S$ when the oxygen is released, and is converted back into $A_2O_2SO_4$ when the oxygen is absorbed. Here, the certain temperature conditions under which the oxygen-absorbing material absorbs the oxygen varies somewhat depending on the rare earth element represented by A, but is generally a temperature range from 500 to over about 600° C.

The NOx-absorbing material in the exhaust gas cleaning catalyst also absorbs and releases NOx under certain temperature conditions. The NOx-absorbing material contains at least one element from alkali metals, alkaline earth metals, and rare earth elements. When the NOx-absorbing material is present in the form of a carbonate of the above elements, if the NOx-absorbing material is exposed to an atmosphere with a high concentration of NOx, the NOx in the atmosphere will be oxidized by the active component and bond with the NOx-absorbing material to be absorbed in the form of a nitrate. When the NOx-absorbing material is exposed to a reducing atmosphere while the NOx is absorbed in this manner, the nitrate will be decomposed by the NOx-absorbing material, and the decomposed material will be reduced to nitrogen by the reducing agent in the atmosphere on the active component. The nitrate will also be decomposed, and the NOx-absorbing material will recover the capacity to absorb NOx. Here, the temperature conditions under which the NOx-absorbing material absorbs and releases NOx are up to about 550° C. The NOx-absorbing material is converted to an oxide (converted to BaO, for example, when the aforementioned element contained in the NOx-absorbing material is Ba) under temperature conditions over the above temperatures, resulting in the loss of the NOx absorption/release capacity.

Thus, when the first exhaust gas cleaning catalyst comprising the above oxygen-absorbing material and NOx-absorbing material is used, the oxygen-absorbing material releases oxygen whenever the temperature of the exhaust to be cleaned is over about 500 to 600° C., so that the oxygen concentration around the exhaust gas cleaning catalyst is kept within a constant range. It is thus possible to keep the active component of the exhaust gas cleaning catalyst in a continuous, stable redox state for cleaning the exhaust gas. Additionally, when the temperature of the exhaust gas to be cleaned is no more than about 550° C., the NOx-absorbing material absorbs NOx, further enhancing the effects by which the exhaust gas cleaning catalyst lowers the NOx concentration in the exhaust gas.

Figure 2:
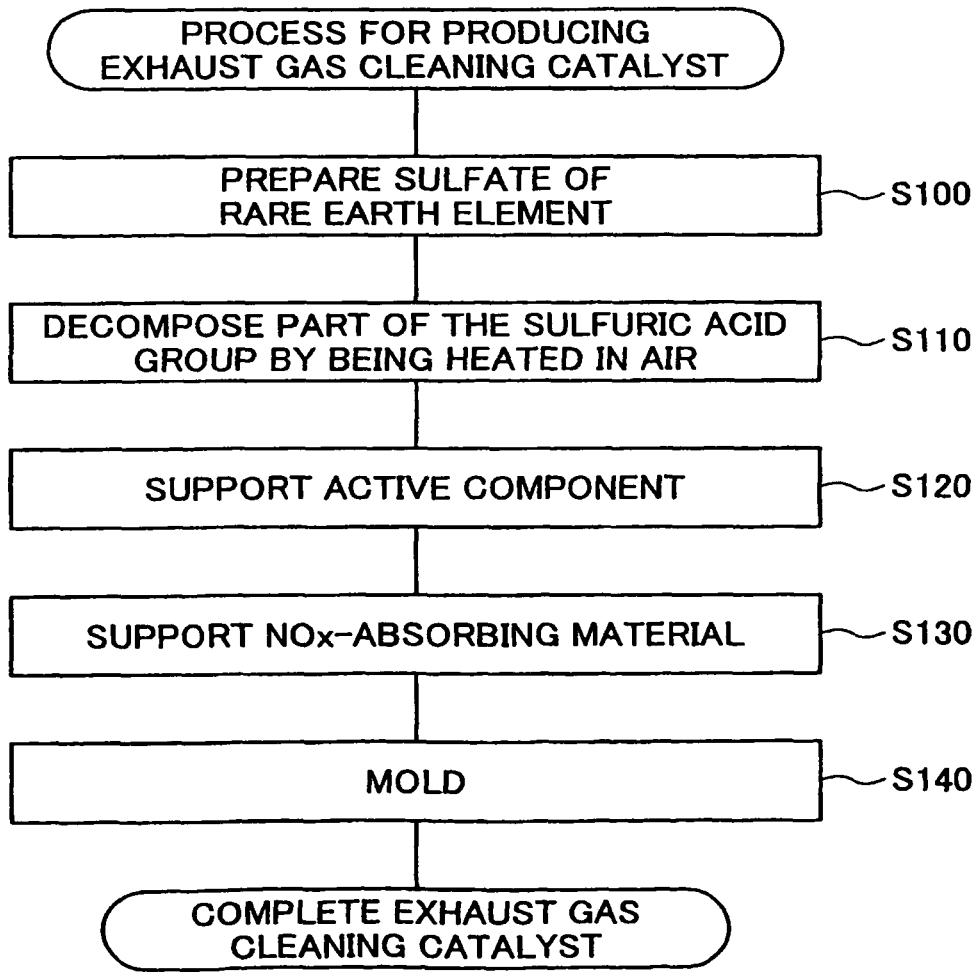
FIG. 2 illustrates a process for producing the first exhaust gas cleaning catalyst.

FIG. 2 illustrates a process for producing the first exhaust gas cleaning catalyst. To produce the first exhaust gas cleaning catalyst, a sulfate of a rare earth element is first prepared (Step S100). Here, the rare earth element for forming the sulfate is preferably selected from the group consisting of lanthanoids such as lanthanum (La), neodymium (Nd), cerium (Ce), praseodymium (Pr), and samarium (Sm), and even more preferably yttrium (Y). The sulfates that are used may also be in the form of hydrates or anhydrides. Hydrates of sulfates of rare earth elements are represented by $A_2(SO_4)_3 \cdot nH_2O$ (A is a rare earth element).

Next, the sulfate of a rare earth element is heated in air to decompose part of the sulfuric acid group, giving a rare earth element oxide sulfate $A_2O_2SO_4$ (A is a rare earth element) (Step S110). In Step S110, the temperature when the sulfate of the rare earth element is being heated should be set as appropriate within the range resulting in the partial decomposition of the sulfuric acid group. The temperature may be set to at least 800° C., for example, to produce $A_2O_2SO_4$ (A is a rare earth element) with a specific area of at least about 15 $m^2/g$. The rare earth element oxide sulfate obtained in Step S110 functions as the oxygen-absorbing material. Fine particles of this oxide sulfate are used below as the catalyst support.

At least one metal from noble metals and transition metals is supported as the active component on the above rare earth element oxide sulfate (Step S120). When a noble metal is supported as the active component, at least one element selected from the group consisting of platinum (Pt), palladium (Pd), rhodium (Rh), and iridium (Ir) is preferably included. When a transition metal is supported as the active component, nickel (Ni) or copper (Cu) may be selected, for example. The active component is supported by dipping the catalyst support obtained in Step S110 in a metal salt solution of the metal being used as the active component. The metal salt solution used in Step S120 may be, for example, a water-soluble solution, such as a nitrate solution of the above metals used as the active component. Fine particles of the catalyst support are dipped in the metal alt solution to allow the metal to be supported on the catalyst support by means of ion exchange, adsorption (penetration), or evaporative drying. After the catalyst support has been dipped in the metal salt solution, the catalyst support is dried and fired so that the active component is supported on the catalyst support.

When the active component is supported, an NOx-absorbing material including at least one element from alkali metals, alkali earth metals, or rare earth elements is also supported on the catalyst support on which the active component has been supported (Step S130). Examples of elements for forming the NOx-absorbing material selected from alkali metals, alkali earth metals, or rare earth elements include barium (Ba), potassium (Ka), and lithium (Li). In this case, a water-soluble solution such as an acetate solution may be used as the salt solution. After the catalyst support has been impregnated with the acetate solution, it is dried and fired, and the acetate is converted to a carbonate (such as barium carbonate, potassium carbonate, or lithium carbonate) so that the NOx-absorbing material is supported on the catalyst support.

The firing step above results in a catalyst powder in the form of a powder comprising the active component and the NOx-absorbing material supported on the catalyst support. This may be further molded to complete the exhaust gas cleaning catalyst (Step S140). Examples of methods for molding the catalyst in Step S140 include methods in which a certain binder is added to the above catalyst powder to produce a slurry which is then applied onto a honeycombed or other catalyst substrate. The honeycomb used as the catalyst substrate may be formed of a ceramic material such as cordierite, or stainless steel, etc. When the surface of the honeycomb is coated with the catalyst slurry, the honeycomb surface may be first coated with a metal oxide such as alumina before the catalyst slurry is applied so as to enhance the adhesion between the catalyst substrate and the catalyst slurry. Alternatively, the process for forming the catalyst in Step S140 may be one in which the fired catalyst powder is compressed and further milled into the form of pellets.

In FIG. 2, the NOx-absorbing material is supported after the active component has been supported on the catalyst support, but Steps S120 and S130 may be done in the reverse order, or the NOx-absorbing material and the active component may be simultaneously supported.

B. First Exhaust Gas Device

Figure 3:
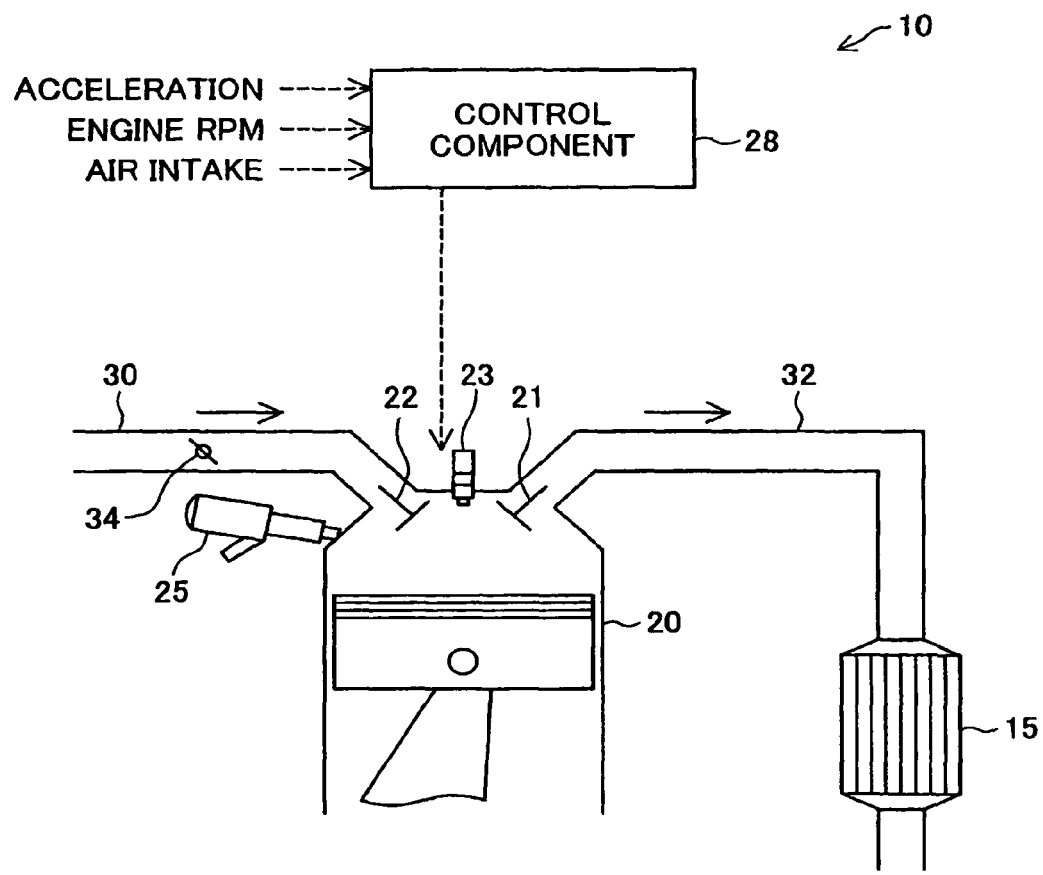
FIG. 3 illustrates the structure of a system equipped with the first exhaust gas cleaning catalyst.

FIG. 3 schematically illustrates the structure of a system 10 equipped with a first exhaust gas cleaning device 15 comprising the first exhaust gas cleaning catalyst, and an engine 20 which is an internal combustion engine. The system 10 further comprises a control component 28 to control the operation of the engine 20. When the system 10 is mounted on a vehicle, for example, the driving force of the vehicle is produced by the engine 20, and the exhaust gas discharged from the engine 20 is cleaned by the exhaust gas cleaning device 15.

The cylinder head of the engine 20 is provided with an intake valve 22 for the intake of air into the combustion chamber, an exhaust valve 21 for the discharge of the exhaust gas from inside the combustion chamber, a spark plug 23, and an injector 25 for spraying fuel. The fuel sprayed from the injector 25 ignites in the combustion chamber and is mixed with air introduced through the intake valve 22 to form an air mixture. An intake manifold 30 for guiding air into the combustion chamber and an exhaust manifold 32 for guiding the exhaust gas discharged from the ignition chamber are also attached to the cylinder head.

A throttle valve 34 for adjusting the amount of air flowing into the combustion chamber is also provided in the intake manifold 30. The throttle valve 34 is opened and closed by a certain throttle motor to bring about the desired amount of air intake in the engine 20. The exhaust manifold 32 is also connected to the exhaust gas cleaning device 15.

A control component (ECU) 28 controls the operation of the engine 20 as a whole, such as control of the fuel injection and control of the ignition timing. The control component 28 is a logical computer circuit composed of a central processing unit (CPU), ROM, RAM, I/O circuit, and the like interconnected by buses. When operations are controlled by the control component 28, the control component 28 obtains data related to various operating conditions, such as the acceleration controlled by the operator, the engine rpm, and the amount of air intake, and drives the throttle motor, spark plug 23, injector 25, or the like according to various programs stored in ROM.

The operating modes of the engine 20 in this system 10 comprise a first mode in which the air/fuel ratio of the combustion in the engine 20 is controlled to the stoichiometric ratio, and a second mode in which the air/fuel ratio of the combustion in the engine 20 is controlled to a lean ratio. The combustion air/fuel ratio is determined primarily by the air intake adjusted by the throttle motor and the fuel injection adjusted by the injector 25. The operating modes are switched by the control component 28 according to the engine rpm and engine torque (load), for example.

The first mode in which the air/fuel ratio is controlled to the stoichiometric ratio is an operating mode that is selected when the engine rpm and engine torque are greater. When the control component 28 selects the first operating mode to control operations, the first exhaust gas cleaning catalyst of the first exhaust gas cleaning device 15 functions as a three-way catalyst. That is, NOx, CO, and HC are cleaned at the same time. In the first mode where the combustion is controlled to the stoichiometric ratio, the temperature of the exhaust gas discharged from the engine 20 is higher, usually 550° C. or higher. As noted above, the oxygen-absorbing material of the first exhaust gas cleaning catalyst may absorb and release oxygen in this temperature range. Thus, in the first operating mode, when the combustion of the engine 20 deviates from the stoichiometric ratio due to delays in control or the like, the oxygen-absorbing material of the first exhaust gas cleaning catalyst absorbs excess oxygen, or releases oxygen when depleted. The stoichiometric operation may thus be kept at a constant level in the exhaust gas cleaning device 15, ensuring that the exhaust gas is consistently cleaned. As also noted above, under the exhaust gas temperature conditions in the first mode, the NOx-absorbing material of the first exhaust gas catalyst is converted to an oxide, resulting in the loss of any NOx absorption and release capacity.

The second mode, which results in a lean air/fuel ratio, is selected when the engine rpm and engine torque are lower. When the control component 28 selects the second operating mode to control operations, the exhaust gas is oxygen-rich, and the active component of the exhaust gas cleaning catalyst in the form of a three-way catalyst cannot continue the usual reaction enough to clean the NOx. In the second mode, the temperature of the exhaust gas discharged from the engine 20 is lower, usually no more than 550° C. That is, the temperature range permits the NOx-absorbing material to absorb and release NOx. Thus, when the second operating mode is selected, the first exhaust gas cleaning catalyst of the first exhaust gas cleaning device 15 functions as what is referred to as an NOx-absorbing reduction type catalyst. This allows the HC and CO in the exhaust gas to be cleaned by the active component and the NOx in the exhaust gas to be absorbed by the NOx-absorbing material in the second operating mode.

When the operating component 28 determines that the amount of NOx in the NOx-absorbing material is over a certain amount during lean operation, a rich spike is generated for a brief period of rich operation. When a rich spike is generated, the exhaust gas is a reducing atmosphere that is rich with reducing agents such as HC or CO, and NOx is released from the NOx-absorbing material and reduced, with the NOx-absorbing material regaining the capacity to absorb NOx. The control component 28 may, for example, sense NOx levels in the exhaust gas to calculate the levels in order to determine the timing of the rich spikes, or rich spikes may be generated at certain intervals. Thus, in the second operating mode, NOx which cannot be treated by the active component of the exhaust gas cleaning catalyst is absorbed by the NOx-absorbing material so that the exhaust gas is consistently cleaned.

As noted above, at the exhaust gas temperature (up to about 550° C.) in the second mode characterized by lean combustion, virtually no oxygen is released by the $A_2O_2SO_4$ (A is a rare earth element) which is the oxygen-absorbing material of the exhaust cleaning device 15. Thus, during lean operation resulting in an excess of oxygen in the exhaust gas, the oxygen-absorbing material absorbs virtually no oxygen. In addition, virtually no oxygen is released during rich spikes in which the oxygen concentration is lower.

In the exhaust gas cleaning device 15 comprising the exhaust gas cleaning catalyst constructed in the manner described above, or in a system 10 comprising the exhaust gas cleaning device 15, when the second mode is selected and the exhaust gas temperature is in a relatively low range in which the NOx-absorbing material absorbs NOx, no oxygen is absorbed or released by the oxygen-absorbing material, so that reducing agents such as HC or CO will not be consumed by any oxygen that would have been released from the oxygen-absorbing material. That is, there is no need to supply excess fuel to the engine 20 during rich spikes in order to sufficiently treat the NOx released from the NOx-absorbing material. Rich spikes may thus be generated without lowering fuel consumption, and the effects in improving fuel consumption by lean operation may be enhanced.

When the first mode is selected and the exhaust gas temperature is in a relatively high range in which the NOx-absorbing material does not absorb NOx, the oxygen-absorbing material has a high capacity for absorbing and releasing oxygen, allowing the exhaust gas cleaning efficiency to be kept at high levels while operation is controlled to the stoichiometric level.

C. Variants of First Exhaust Gas Cleaning Catalyst and Exhaust Gas Cleaning Device In the first exhaust gas cleaning catalyst described above, the catalyst support was an oxygen-absorbing material represented by $A_2O_2SO_4$ and/or $A_2O_2S$ (A is a rare earth element), and the NOx-absorbing material and metal serving as the active component were supported on the catalyst support, but the structure may be different. For example, a porous oxide such as alumina ($Al_2O_3$), zirconia ($ZrO_2$), titania ($TiO_2$), or silica ($SiO_2$) may also be used as a catalyst support in addition to the oxygen-absorbing material represented by $A_2O_2SO_4$ and/or $A_2O_2S$ (A is a rare earth element). In such cases, fine particle of the above porous oxides may be mixed with fine particles of $A_2O_2SO_4$ and/or $A_2O_2S$ (A is a rare earth element) before Step S120 in which the active component is supported in FIG. 2, and the fine particle mixture may be used as the catalyst support to produce the exhaust gas cleaning catalyst.

Alternatively, an oxide such as the alumina described above may be used on its own as the catalyst support, and the oxygen-absorbing material may be separately added to the cleaning catalyst without being used as the catalyst support. For example, the active component and NOx-absorbing material may be supported using an oxide such as alumina as the catalyst support instead of the oxygen-absorbing material and the oxygen-absorbing material may be mixed with the catalyst support oxide when forming the catalyst.

It is also possible to provide in separate form a catalyst component comprising a catalyst support oxide in which the active component and NOx-absorbing material are supported on alumina or the like, and an oxygen-absorbing component comprising an oxygen-absorbing material represented by $A_2O_2SO_4$ and/or $A_2O_2S$ (A is a rare earth element). For example, a catalyst component consisting of a honeycomb coated with a paste containing the catalyst support oxide may be produced separately from an oxygen-absorbing component consisting of a honeycomb coated with a paste containing the oxygen-absorbing material. The two should be connected in a straight line in the exhaust manifold 32 so that the oxygen-absorbing component is upstream of the catalyst component relative to the flow of exhaust gas in the same system as in FIG. 3. The oxygen-absorbing material absorbs the oxygen in the exhaust gas when there is an excess of oxygen, and releases oxygen in the exhaust gas when the oxygen is depleted, resulting in the same effects as long as the active component of the cleaning catalyst is kept in a stoichiometric environment.

D. Second Exhaust Gas Cleaning Catalyst

In the second exhaust gas cleaning catalyst, an oxygen-absorbing material represented by $A_2O_2SO_4$ and/or $A_2O_2S$ (A is a rare earth element) serves as a first oxygen-absorbing material in the same manner as in the first exhaust gas cleaning catalyst, and the first oxygen-absorbing material is used as the catalyst support to support the active component metal on the catalyst support. In addition to the first oxygen-absorbing material, the second exhaust gas cleaning catalyst has a second oxygen-absorbing material which absorbs and released oxygen at lower temperatures than the temperature at which the first oxygen-absorbing material absorbs and releases oxygen.

Thus, when the second exhaust gas cleaning catalyst comprising first and second oxygen-absorbing materials is used, the oxygen concentration around the exhaust gas cleaning catalyst may be kept constant at a broader temperature range combining the temperature range at which the first oxygen-absorbing material absorbs and releases oxygen and the temperature range at which the second oxygen-absorbing material absorbs and releases oxygen. The active component of the exhaust cleaning catalyst may thus be consistently kept in a redox state for continuously cleaning the exhaust gas at the broader temperature range.

Figure 4:
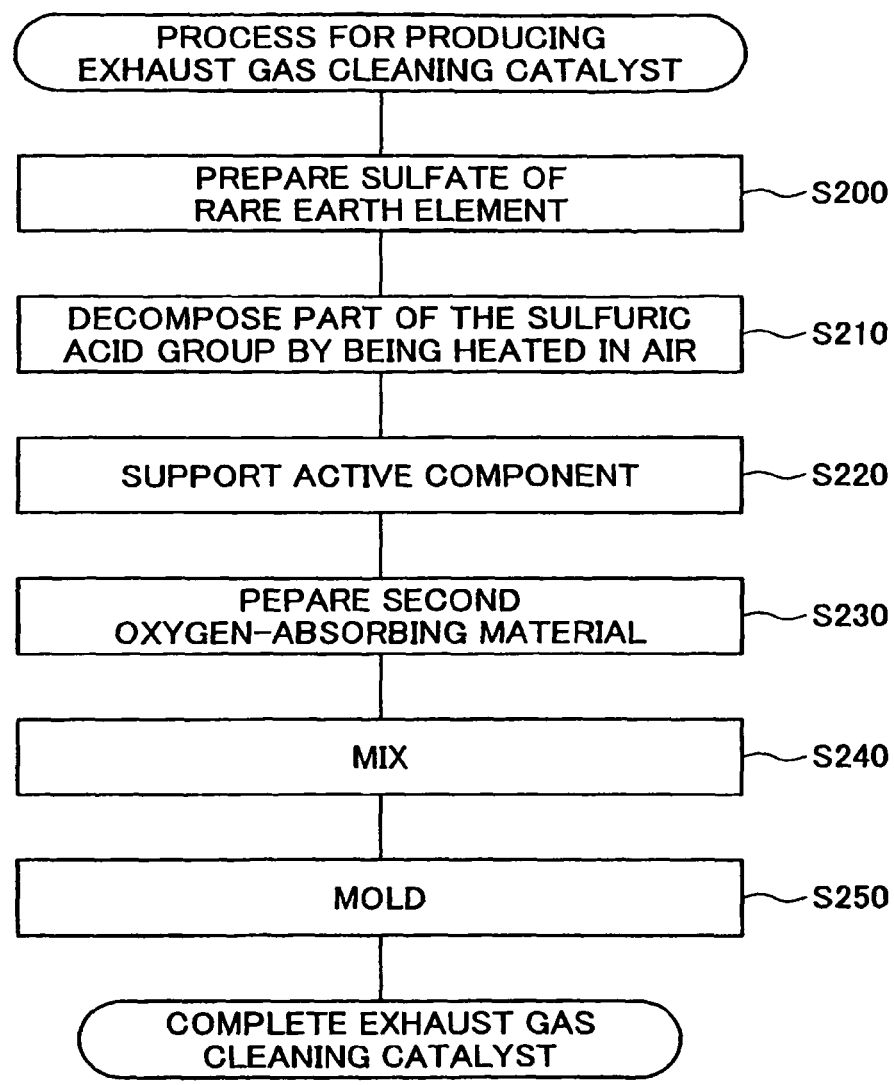
FIG. 4 illustrates a process for producing the second exhaust gas cleaning catalyst.

FIG. 4 illustrates a process for producing the second exhaust gas cleaning catalyst. In FIG. 4, the process is the same as Steps S100 to S120 in FIG. 2 up to Steps S200 to S220. A first oxygen-absorbing material represented by $A_2O_2SO_4$ (A is a rare earth element) may thus be used as the catalyst support to support the same active component as in the first exhaust gas cleaning catalyst on the catalyst support. After that, the second oxygen-absorbing material which absorbs and releases oxygen at a lower temperature than the first oxygen-absorbing material is prepared (Step S230). The first oxygen-absorbing material which is represented by $A_2O_2SO_4$ and/or $A_2O_2S$ (a is a rare earth element) usually absorbs and releases oxygen at about 500° C. or higher. Oxides containing Ce, such as $CeO_2$—$ZrO_2$ compound oxides ($CeO_2$—$ZrO_2$ solid solution) or $CeO_2$ may thus be used as the second oxygen-absorbing material for absorbing and releasing oxygen at lower temperature ranges. Such oxides containing Ce are conventionally known oxygen-absorbing materials, and absorb and release oxygen at a temperature range of about 100 to 500° C.

To obtain a $CeO_2$—$ZrO_2$ compound oxide, aqueous solutions of $ZrO(NO_3)_2$—$2H_2O$ and $Ce(NO_3)_3$—$6H_2O$ are each prepared, and the two aqueous solutions are mixed in a certain proportion. The resulting aqueous solution is neutralized, so that the resulting hydroxide aggregates containing Zr and Ce are obtained in the form of precipitate, and the hydroxide aggregate that has been recovered is fired, giving a $CeO_2$—$ZrO_2$ compound oxide. The second oxygen-absorbing material and the first oxygen-absorbing material which supports the active component are then mixed (Step S240).

When the first oxygen-absorbing material which supports the active component and the second oxygen-absorbing material are mixed, they are also molded to finish the second exhaust gas cleaning catalyst (Step S250). The catalyst may be formed in Step S250 in various ways, such as forming pellets or supporting the components on a catalyst substrate such as a honeycomb in the same manner as in Step S140 in FIG. 2.

E. Second Exhaust Gas Cleaning Device

The second exhaust gas cleaning device comprising the second exhaust gas cleaning catalyst may be used instead of the first exhaust gas cleaning device 15 in the system illustrated in FIG. 3. In a system thus comprising the second exhaust gas cleaning device, the control component 28 keeps the operations at a constant stoichiometric level regardless of exhaust gas temperature. When the exhaust gas temperature is about 500° C. or lower in the second exhaust gas cleaning device, the second oxygen-absorbing material absorbs excess oxygen and releases oxygen when depleted. When the exhaust gas temperature is over about 500° C., the first oxygen-absorbing material absorbs excess oxygen and releases oxygen when depleted.

The second exhaust gas cleaning device comprising the second exhaust gas cleaning catalyst constructed in the manner described above, or a system comprising the second exhaust gas cleaning device, has a plurality of oxygen-absorbing materials which absorb and release oxygen at different temperatures, making it possible to broaden the exhaust gas temperature range at which the exhaust gas may be cleaned well. Thus, even when changes in load result in different exhaust gas temperatures, operations may be kept at the stoichiometric level, allowing NOx, CO, and HC to be cleaned more consistently. More particularly, because an oxygen-absorbing material represented by $A_2O_2SO_4$ and/or $A_2O_2S$ (A is a rare earth element) is used as the first oxygen-absorbing material and an oxide containing Ce, such as $CeO_2$ or a $CeO_2$—$ZrO_2$ compound oxide, is used as the second oxygen-absorbing material, there are no overlapping temperature ranges at which the oxygen-absorbing materials substantially absorb and release oxygen with the second exhaust gas cleaning catalyst. The effect of broadening the exhaust gas temperature range at which the exhaust gas may be cleaned well may therefore be more efficiently enhanced.

The first oxygen-absorbing material represented by $A_2O_2SO_4$ and/or $A_2O_2S$ (A is a rare earth element) also absorbs and releases oxygen more than second oxygen-absorbing materials such as $CeO_2$—$ZrO_2$ compound oxides. Here, when the exhaust gas temperature is in the high range where the first oxygen-absorbing material absorbs and releases oxygen, the load is generally high, and the amount of exhaust gas is greater. The second exhaust gas cleaning catalyst has a first oxygen-absorbing material capable of absorbing and releasing more oxygen at high temperatures where there are greater amounts of exhaust gas to be treated, thereby further enhancing improvement in the exhaust gas cleaning efficiency with three-way catalysts.

F. Variants of Second Exhaust Gas Cleaning Catalyst and Exhaust Gas Cleaning Device In the second exhaust gas cleaning catalyst described above, the first oxygen-absorbing material supporting the active component and the second oxygen-absorbing material were mixed, but they may also be different structures. For example, the second oxygen-absorbing material may also be supported in addition to the active component on the first oxygen-absorbing material serving as the catalyst support. In addition to the first oxygen-absorbing material, a porous oxide such as alumina ($Al_2O_3$), zirconia ($ZrO_2$), titania ($TiO_2$), or silica ($SiO_2$) may also be used as a catalyst support.

Alternatively, the active component may be supported on the first oxygen-absorbing material, the second oxygen-absorbing material may be supported on an oxide such as alumina, and the two may be mixed. An oxide such as alumina may also be used as the catalyst support supporting the active component, and the first and second oxygen-absorbing materials may be mixed with the catalyst support on which the active component has been supported.

Alternatively, a catalyst component comprising a catalyst-supporting oxide may be provided, where the active component is supported on alumina or the like, and at least one of the first or second oxygen-absorbing material may be disposed inside a separately provided oxygen-absorbing component, without being disposed inside the catalyst. In such cases, oxygen-absorbing component and catalyst component should be connected in the exhaust manifold so that the oxygen-absorbing component is upstream of the catalyst component relative to the flow of exhaust gas.

Combinations of the first oxygen-absorbing material represented by $A_2O_2SO_4$ and/or $A_2O_2S$ (A is a rare earth element) and something other than the second oxygen-absorbing material consisting of an oxide containing Ce may also be used. A better exhaust gas cleaning capacity may be achieved at a broader temperature range, provided that a plurality of oxygen-absorbing materials which absorb and release oxygen at different temperatures are combined.

EXAMPLES

The oxygen-absorbing materials of Examples 1 through 4 and the oxygen-absorbing material of Comparative Example were prepared to compare the oxygen absorbing and releasing capacities. Here, the oxygen-absorbing materials of the examples were not the first and second exhaust gas cleaning catalysts of the invention, but were oxygen-absorbing materials represented by $A_2O_2SO_4$ (A is a rare earth element) used in the catalysts. Active components supported on the oxygen-absorbing materials of the examples were used as catalysts in the examples. The oxygen-absorbing material in the comparative example was an oxygen-absorbing material containing Ce, and the catalyst of the comparative example was the active component supported on the oxygen-absorbing material of the comparative example.

A) Preparation of Oxygen-Absorbing Material

A-1) Oxygen-Absorbing Materials of Examples 1 Through 4

The oxygen-absorbing materials in Examples 1 through 4 are represented by $A_2O_2SO_4$ (A is a rare earth metal) comprising, respectively, lanthanum (La), praseodymium (Pr), neodymium (Nd), and samarium (Sm), and even more preferably yttrium (Y). The sulfates that are used may also be in the form of hydrates or anhydrides. Hydrates of sulfates of rare earth elements are represented by $A_2(SO_4)_3 \cdot nH_2O$ (A is a rare earth element). Sulfates ($A_2(SO_4)_3$-$nH_2O$) of the above elements were used to produce the oxygen-absorbing materials of Examples 1 through 4. The sulfates were fired for 5 hours at 900° C. in a nitrogen stream, giving the above oxygen-absorbing materials of Examples 1 through 4 in the form of powder. The oxygen-absorbing materials of Examples 1 through 4 correspond to the oxygen-absorbing material in the first exhaust gas cleaning catalyst or the oxygen-absorbing material in the second exhaust gas cleaning catalyst as embodiments of the invention.

A-2) Oxygen-Absorbing Material of Comparative Example 1

The oxygen-absorbing material of Comparative Example 1 was a $CeO_2$—$ZrO_2$ compound oxide, and was produced by solution synthesis using diammonium cerium nitrate and zirconium oxynitrate. That is, a mixture of aqueous solutions of the above reagents was neutralized, and the resulting hydroxide precipitate was fired to produce a compound oxide. The reagents were mixed to a Ce:Zr molar ratio of 1:1. The $CeO_2$—$ZrO_2$ compound oxide is a known oxide with a greater oxygen absorbing and releasing capacity than $CeO_2$ conventionally used as an auxiliary catalyst to enhance the oxygen absorbing capacity in three-way catalysts. The oxygen-absorbing material of the Comparative Example 1 corresponds to the second oxygen-absorbing material in the second exhaust gas cleaning catalyst as an embodiment of the invention.

A-3) Catalysts of Examples 1 Through 4

The catalysts of Examples 1 through 4 were Pd, the active component, supported on the oxygen-absorbing materials of Examples 1 through 4, which served as catalyst supports. To produce the catalyst in Examples 1 through 4, the powder oxygen-absorbing materials of Examples 1 through 4 were dispersed in palladium nitrate solutions containing Pd in an amount corresponding to 1 wt % of the catalyst support, the mixtures were stirred and dried, and the Pd was evaporated to dryness so that it was supported on the catalyst support. The material was fired for 2 hours at 400° C. at that time. The fired product was further compressed and milled, the resulting powder was sifted, and the sifted material was molded into pellets with a particle size of 0.5 mm to 1 mm, giving the catalysts of Examples 1 through 4. NOx-absorbing materials were then added to the catalysts of Examples 1 through 4, giving the first exhaust gas cleaning catalyst as an embodiment of the invention. A second oxygen-absorbing material containing Ce was also added to the catalysts of Examples 1 through 4, giving the second exhaust gas cleaning catalyst as an embodiment of the invention.

A-4) Catalyst of Comparative Example 1

The catalyst of Comparative Example 1 was Pt as the active component supported on the oxygen-absorbing material of Comparative Example 1 as the catalyst support. To produce the catalyst of Comparative Example 1, the powder of the oxygen-absorbing material in Comparative Example 1 was dispersed in platinum nitrate solution containing Pt in an amount corresponding to 1 wt % of the catalyst support, the mixture was stirred and dried, and the Pt was evaporated to dryness so that it was supported on the catalyst support. The material was fired for 2 hours at 400° C. at that time. The fired product was further compressed and milled, the resulting powder was sifted, and the sifted material was molded into pellets with a particle size of 0.5 mm to 1 mm, giving the catalyst of Comparative Example 1.

B) Evaluation of Oxygen Absorption and Release Capacity

Figure 5:
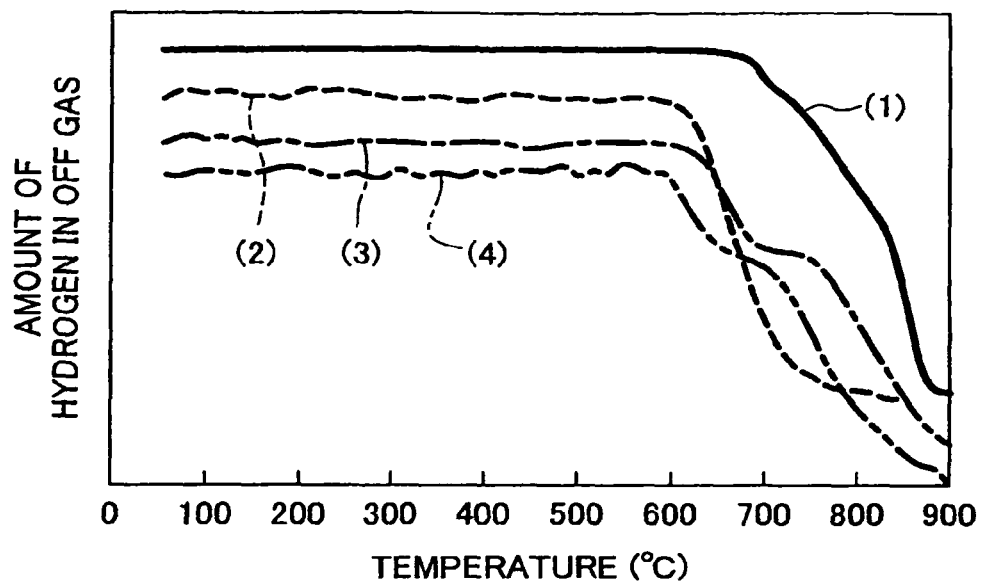
FIG. 5 illustrates the results from studying the oxygen-releasing capacity of oxygen-absorbing materials in Examples 1 through 4.

FIG. 5 illustrates the results from studying the oxygen-releasing capacity of oxygen-absorbing materials in Examples 1 through 4. To study the oxygen absorption and release capacity, quadrupole type mass spectrometry reactors were each filled, respectively, with 1 g from one of the oxygen-absorbing materials of Examples 1 through 4, and the temperature was raised to 900° C. at a rate of 10° C. per minute as test gas (10% $H_2$, balance He) was fed. Upon the supply of the test gas containing the hydrogen in this manner, the oxygen that was released from the oxygen-absorbing material reacted with the hydrogen in the test gas, producing water. Thus, the greater the amount of oxygen that was released, the greater the consumption of the hydrogen in the test gas, resulting in less hydrogen in the exhaust gas. In FIG. 5, the horizontal axis represents the reactor temperature, and the longitudinal axis represents the amount of hydrogen in the gas, as calculated from the ion intensity.

FIG. 5 shows that the oxygen-absorbing materials of Examples 1 through 4 all had good oxygen release capacities at a temperature range from 600 to higher than 700° C. The following scheme (1) shows the change in the oxygen-absorbing material of Example 1 when treated in the above reducing atmosphere. The oxygen-absorbing materials of the other Examples 2 through 4 similarly changed.

$$La_2O_2SO_4 \rightarrow La_2O_2S + 2O_2 \tag{1}$$

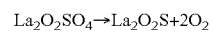

Figure 6:
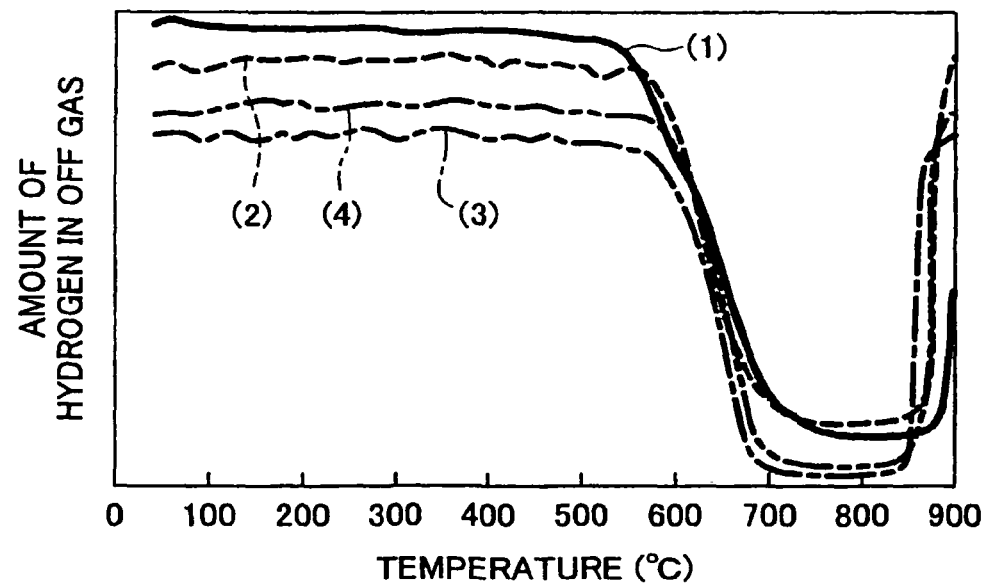
FIG. 6 illustrates the results from studying the oxygen-releasing capacity of catalysts in Examples 1 through 4.

FIG. 6 shows the results of a study of the oxygen release capacity of the catalysts of Examples 1 through 4 under similar conditions. The catalysts of Examples 1 through 4 all had good oxygen release capacities at a high temperature range of 550 to more than 650° C. Comparison of FIGS. 5 and 6 reveals that the catalysts of Examples 1 through 4 comprising the noble metal Pd had better oxygen release capacities starting on the lower temperature side compared to the oxygen-absorbing materials of Examples 1 through 4 which did not include a noble metal.

In FIGS. 5 and 6, the detection level at temperature ranges no greater than 550° C. where oxygen was not sufficiently released varied by sample. The graphs are parallel to each other at the temperature ranges. This is because the base detection level varies each time the amount of oxygen released was detected. The amount of oxygen released by each sample may thus be ascertained as the difference between the base levels and the amounts of hydrogen in the off gas.

Figure 7:
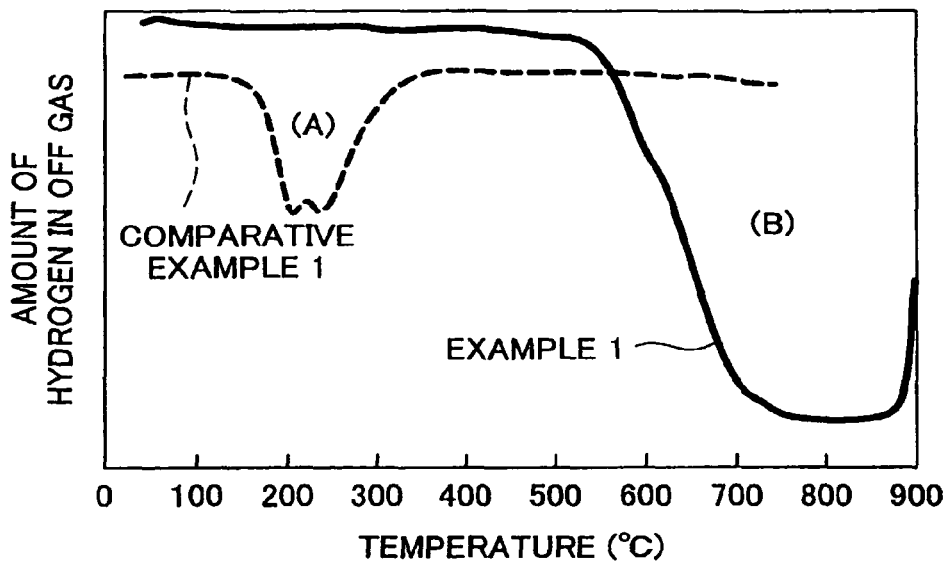
FIG. 7 illustrates the results of a comparison of the oxygen-releasing capacity between the catalyst of Example 1 and the catalyst of Comparative Example 1.

FIG. 7 illustrates the results of a comparison of the oxygen-releasing capacity between the catalyst of Example 1 and the catalyst of Comparative Example 1. The method for measuring the oxygen release capacity was the same as that used to show the results in FIGS. 5 and 6. The results for the catalyst of Example 1 in FIG. 7 are the same as the results for the catalyst of Example 1 in FIG. 6. FIG. 7 shows that the catalyst of Comparative Example 1 had an oxygen release capacity at a lower temperature range of 200 to 400° C. Here, the area of region (A) in FIG. 7 shows the approximate amount of oxygen released from the catalyst of Comparative Example 1, while the area of region (B) shows the approximate amount of oxygen released from the catalyst of Example 1. A comparison of the areas of regions (A) and (B) thus shows that the amount of oxygen released by the catalyst in Example 1 is about 8 times greater than that released by the catalyst of Comparative Example 1.

The results of the study of the oxygen release capacity of the oxygen-absorbing material in Comparative Example 1 are not described, but the oxygen-absorbing material of Comparative Example 1, which did not include a noble metal, had a lower oxygen release capacity than the catalyst of Comparative Example 1 which included the noble metal Pt.

The following scheme (2) shows the changes in the oxygen-absorbing material of Comparative Example 1 when treated in the above reducing atmosphere, where the example is of a $CeO_2$—$ZrO_2$ compound oxide.

$$(CeZr)O_2 \rightarrow (CeZr)O_{1.5} + \tfrac{1}{4}O_2 \quad (2)$$

Figure 8:
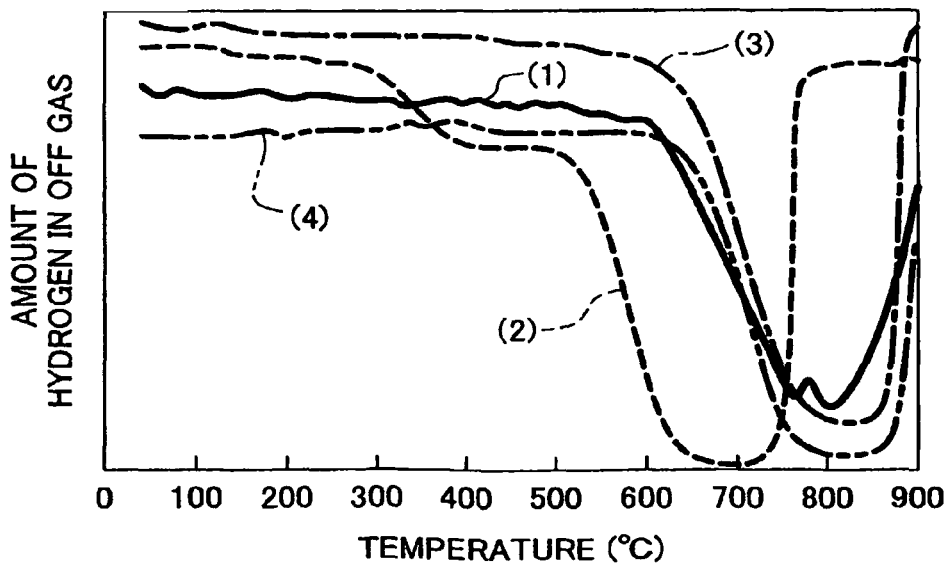
FIG. 8 illustrates the results from studying the oxygen-absorbing capacity of oxygen-absorbing materials in Examples 1 through 4.

FIG. 8 illustrates the results from studying the oxygen-absorbing capacity of oxygen-absorbing materials in Examples 1 through 4. To study the oxygen absorption capacity, quadrupole type mass spectrometry reactors were each filled, respectively, with 1 g from one of the oxygen-absorbing materials of the examples (in fact, they had cooled to about ambient temperature after the test showing the results in FIG. 5), and the temperature was raised to 900° C. at a rate of 10° C. per minute as test gas (5% $O_2$, balance He) was fed. In FIG. 8, the horizontal axis represents the reactor temperature, and the longitudinal axis represents the amount of oxygen in the off gas, as calculated from the ion intensity.

FIG. 8 shows that all of the oxygen-absorbing materials of Examples 1 through 4 had good oxygen absorption capacities at temperature ranges from 500 to higher than 600° C. When exposed to the oxidizing atmosphere, the reaction was the reverse of that in the reducing atmosphere described above. The reaction of the oxygen-absorbing material of Example 1, for example, progressed opposite scheme (1).

Figure 9:
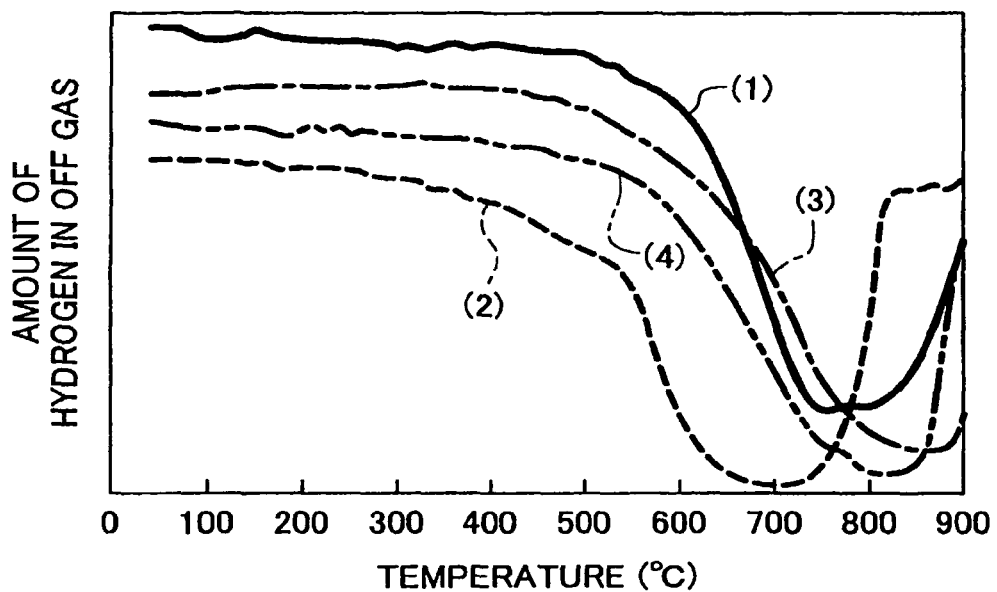
FIG. 9 illustrates the results from studying the oxygen-absorbing capacity of catalysts in Examples 1 through 4.

FIG. 9 shows the results of a study of the oxygen absorption capacity of the catalysts of Examples 1 through 4 under similar conditions. The catalysts of Examples 1 through 4 all had good oxygen absorption capacities at a temperature range higher than 500 to 600° C. Comparison of FIGS. 8 and 9 reveals that the catalysts of Examples 1 through 4 comprising the noble metal Pd had better oxygen absorption capacities starting on the lower temperature side compared to the oxygen-absorbing materials of Examples 1 through 4 which did not include a noble metal. The amount of oxygen absorbed by the oxygen-absorbing materials and catalysts of the examples shown in FIGS. 8 and 9 may also be ascertained as the difference between the base levels and the amounts of oxygen in the off gas.

Figure 10:
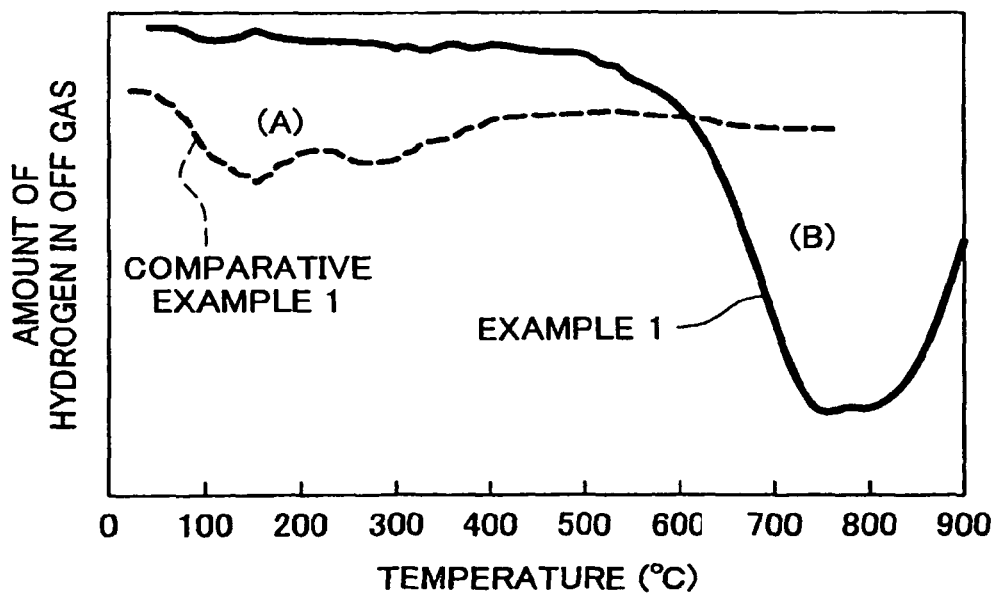
FIG. 10 illustrates the results of a comparison of the oxygen-absorbing capacity between the catalyst of Example 1 and the catalyst of Comparative Example 1.

FIG. 10 illustrates the results of a comparison of the oxygen-absorbing capacity between the catalyst of Example 1 and the catalyst of Comparative Example 1. The method for measuring the oxygen absorption capacity was the same as that used to show the results in FIGS. 8 and 9. The results for the catalyst of Example 1 in FIG. 10 are the same as the results for the catalyst of Example 1 in FIG. 8. FIG. 10 shows that the catalyst of Comparative Example 1 had an oxygen absorption capacity at a lower temperature range of 200 to 400° C. Here, the area of region (A) in FIG. 7 shows the approximate amount of oxygen absorbed by the catalyst of Comparative Example 1, while the area of region (B) shows the approximate amount of oxygen absorbed by the catalyst of Example 1. A comparison of the areas of regions (A) and (B) thus shows that the amount of oxygen absorbed by the catalyst in Example 1 is about 8 times greater than that absorbed by the catalyst of Comparative Example 1.

The results of the study of the oxygen absorption capacity of the oxygen-absorbing material in Comparative Example 1 are not described, but the oxygen-absorbing material of Comparative Example 1, which did not include a noble metal, had a lower oxygen absorption capacity than the catalyst of Comparative Example 1 which included the noble metal Pt. Here, the reaction of the oxygen-absorbing material of Comparative Example 1 when absorbing oxygen was the reverse of that in scheme (2).

The invention claimed is:

1. An exhaust gas cleaning catalyst for cleaning exhaust gas by redox, the exhaust gas cleaning catalyst comprising:
   at least one type of metal of noble metals and transition metals;
   NOx-absorbing material for absorbing and releasing nitrogen oxides according to the surrounding nitrogen oxide concentration; and
   an oxygen absorbing and releasing material comprising a compound represented by $A_2O_2SO_4$ and/or $A_2O_2S$ (A is a rare earth element), wherein
   the at least one type of metal and the NOx-absorbing material are located in a same layer and are supported on the oxygen absorbing and releasing material.

2. An exhaust gas cleaning catalyst according to claim 1, wherein the NOx-absorbing material comprises at least one element among alkali metals, alkaline earth metals, and rare earth elements.

3. An exhaust gas cleaning device for cleaning exhaust gas by redox, the exhaust gas cleaning device comprising:
   an exhaust gas cleaning catalyst according to claim 1.

4. A system comprising an internal combustion engine, the system comprising:
   the exhaust gas cleaning device according claim 3, the exhaust gas discharged from the internal combustion engine being introduced thereto; and
   a control component for switching operating modes of the internal combustion engine between a first mode in which the air/fuel ratio of the combustion in the internal combustion engine is controlled to the stoichiometric ratio, and a second mode in which the air/fuel ratio of the combustion in the internal combustion engine results in an excess of oxygen.

5. A system according to claim 4, wherein the NOx-absorbing material comprises at least one element among alkali metals, alkaline earth metals, and rare earth elements.

6. A system according to claim 4, wherein
   the control component switches operating modes of the internal combustion engine according to a rotation speed and an output torque of the internal combustion engine, and
   the exhaust gas cleaning catalyst serves as a three-way catalyst simultaneously treating NOx, CO, and HC included in the exhaust gas in the first mode, while serving as a NOx-absorbing reduction catalyst treating HC and CO included in the exhaust gas by the at least one type of metal thereof and absorbing NOx included in the exhaust gas by the NOx-absorbing material thereof in the second mode.

7. A system according to claim 4, wherein
the exhaust gas cleaning catalyst serves as a three-way catalyst simultaneously treating NOx, CO, and HC included in the exhaust gas in the first mode, while serving as a NOx-absorbing reduction catalyst treating HC and CO included in the exhaust gas by the at least one type of metal thereof and absorbing NOx included in the exhaust gas by the NOx-absorbing material thereof in the second mode.

* * * * *